US012606099B1

(12) United States Patent
    Lehew

(10) Patent No.: US 12,606,099 B1
(45) Date of Patent: Apr. 21, 2026

(54) TABLE

(71) Applicant: Outwest Gear & Apparel, LLC,
    Phoenix, AZ (US)

(72) Inventor: David Lehew, Phoenix, AZ (US)

(73) Assignee: Outwest Gear & Apparel, LLC,
    Phoenix, AZ (US)

( * ) Notice: Subject to any disclaimer, the term of this
    patent is extended or adjusted under 35
    U.S.C. 154(b) by 57 days.

(21) Appl. No.: 18/743,829

(22) Filed: Jun. 14, 2024

(51) Int. Cl.
    *B60R 11/00* (2006.01)
    *B60N 3/00* (2006.01)

(52) U.S. Cl.
    CPC .............. *B60R 11/00* (2013.01); *B60N 3/001*
    (2013.01); *B60R 2011/004* (2013.01); *B60R*
    *2011/007* (2013.01); *B60R 2011/0073*
    (2013.01); *B60R 2011/0084* (2013.01)

(58) Field of Classification Search
    CPC .............. B60R 11/00; B60R 2011/004; B60R
    2011/007; B60R 2011/0073; B60R
    2011/0084; B60R 9/06; B60D 1/00;
    B60D 1/07; B60D 1/075; A47B 31/06;
    A47B 13/00; A47B 13/003; A47B
    2200/0026; A47B 2200/0027; B60N
    3/004; B60N 3/001
    USPC .... 108/44, 67; 224/519, 521, 524, 528, 529,
    224/530; 280/504
    See application file for complete search history.

(56) References Cited

U.S. PATENT DOCUMENTS

| | | | | | |
|---|---|---|---|---|---|
| 5,699,985 | A | * | 12/1997 | Vogel | B60R 9/06 |
| | | | | | 224/521 |
| 5,857,741 | A | * | 1/1999 | Anderson | A47B 83/02 |
| | | | | | 224/521 |
| 6,125,771 | A | * | 10/2000 | Platt | A47B 3/083 |
| | | | | | 108/115 |
| 6,314,891 | B1 | * | 11/2001 | Larson | B60N 3/001 |
| | | | | | 224/521 |
| 6,467,417 | B1 | * | 10/2002 | Guyot | B60P 3/14 |
| | | | | | 108/44 |
| 2018/0344027 | A1 | * | 12/2018 | Hall | A47B 13/003 |

* cited by examiner

Primary Examiner — Daniel J Troy
Assistant Examiner — Elizabeth Irene Artalejo
(74) *Attorney, Agent, or Firm* — IPTechLaw

(57) ABSTRACT

Implementations of tables may include a shank configured to
be inserted into a hitch receiver, a first leg receiver directly
coupled to the shank, a second leg receiver directly coupled
to the shank, a first leg configured to be received into the first
leg receiver, a second leg configured to be received into the
second leg receiver, a first table support configured to couple
to an end of the first leg, and a second table support
configured to couple to an end of the second leg. The first leg
receiver and the second leg receiver may extend below the
shank when the shank is coupled within a hitch receiver. The
first leg receiver and the second leg receiver may be angled
towards one another.

16 Claims, 18 Drawing Sheets

TABLE

BACKGROUND

1. Technical Field

Aspects of this document relate generally to tables. More specific implementations involve tables attached to vehicles.

2. Background

A table is a piece of furniture with a flat top. Tables are commonly supported by four legs. Tables may be at a height configured to allow people to sit in chairs around the table and perform an activity at the table, such as eating.

SUMMARY

Implementations of tables may include a shank configured to be inserted into a hitch receiver, a first leg receiver directly coupled to the shank, a second leg receiver directly coupled to the shank, a first leg configured to be received into the first leg receiver, a second leg configured to be received into the second leg receiver, a first table support configured to couple to an end of the first leg, and a second table support configured to couple to an end of the second leg. The first leg receiver and the second leg receiver may extend below the shank when the shank is coupled within a hitch receiver. The first leg receiver and the second leg receiver may be angled towards one another.

Implementations of tables may include one, all, or any of the following:

A platform configured to rest upon the first table support and the second table support. The platform may include at least eight slats configured to fold relative to one another.

The platform may be configured to directly couple to the first table support and the second table support through a plurality of magnets.

When the table is coupled within a hitch receiver of a truck, the tailgate of the truck may be configured to fold fully down.

The first leg receiver may be directly coupled to a first side of the shank, the second leg receiver may be directly coupled to the second side of the shank opposite the first side of the shank, and the first leg receiver may contact the second leg receiver.

An entire length of the first leg may be straight and an entire length of the second leg may be straight.

Implementations of tables may include a shank, a first leg receiver, a second leg receiver, a first leg configured to be received into the first leg receiver, a second leg configured to be received into the second leg receiver, a first table support configured to couple to an end of the first leg, and a second table support configured to couple to an end of the second leg. The first leg receiver and the second leg receiver may extend below the shank when the shank is coupled within a hitch receiver. The first leg receiver and the second leg receiver may extend into a volume of the shank. The first leg receiver and the second leg receiver may be angled towards one another.

Implementations of tables may include one, all, or any of the following:

The first leg receiver may contact the second leg receiver.

An entire length of the first leg may be straight and an entire length of the second leg may be straight.

Implementations of tables may include a platform configured to directly couple to the first table support and the second table support. The platform may include a plurality of slats foldable relative to one another.

When the table is coupled within a hitch receiver of a truck, the tailgate of the truck may be configured to fold fully down.

Implementations of tables may include a first elbow that couples the first leg to the first table support and a second elbow that couples the second leg to the second table support.

Implementations of tables may include a shank, a first leg receiver directly coupled to a first side of the shank, a second leg receiver directly coupled to a second side of the shank, a first leg configured to be received into the first leg receiver, a second leg configured to be received into the second leg receiver, a first table support configured to couple to an end of the first leg, a second table support configured to couple to an end of the second leg, and a platform configured to directly couple to the first table support and the second table support. The first table support may include a first member and a second member and the second table support may include a third member and a fourth member. The first leg receiver and the second leg receiver may extend below the shank when the shank is coupled within a hitch receiver. The first leg receiver and the second leg receiver may extend into a volume of the shank. The first member may be rotatably coupled to the second member and the third member may be rotatably coupled to the fourth member. The first leg and the second leg may be configured to allow a tailgate of a truck to be folded fully downward when the table is coupled within a hitch receiver. The first leg receiver and the second leg receiver may be angled towards one another.

Implementations of tables may include one, all, or any of the following:

An entire length of the first leg may be straight and an entire length of the second leg may be straight.

A height of the first table support and a height of the second table support may be adjustable.

The first leg receiver may be directly coupled to the second leg receiver.

The platform may be directly coupled to the first table support and the second table support through a plurality of magnets.

The platform may include 8 or more slats, wherein each of the slats is foldable relative to one another.

Implementations of tables may include a first locking pin configured to secure the first table support to a first elbow and a second locking pin configured to secure the second table support to a second elbow The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended tables will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such tables, and implementing components and methods, consistent with the intended operation and methods.

Figure 1:
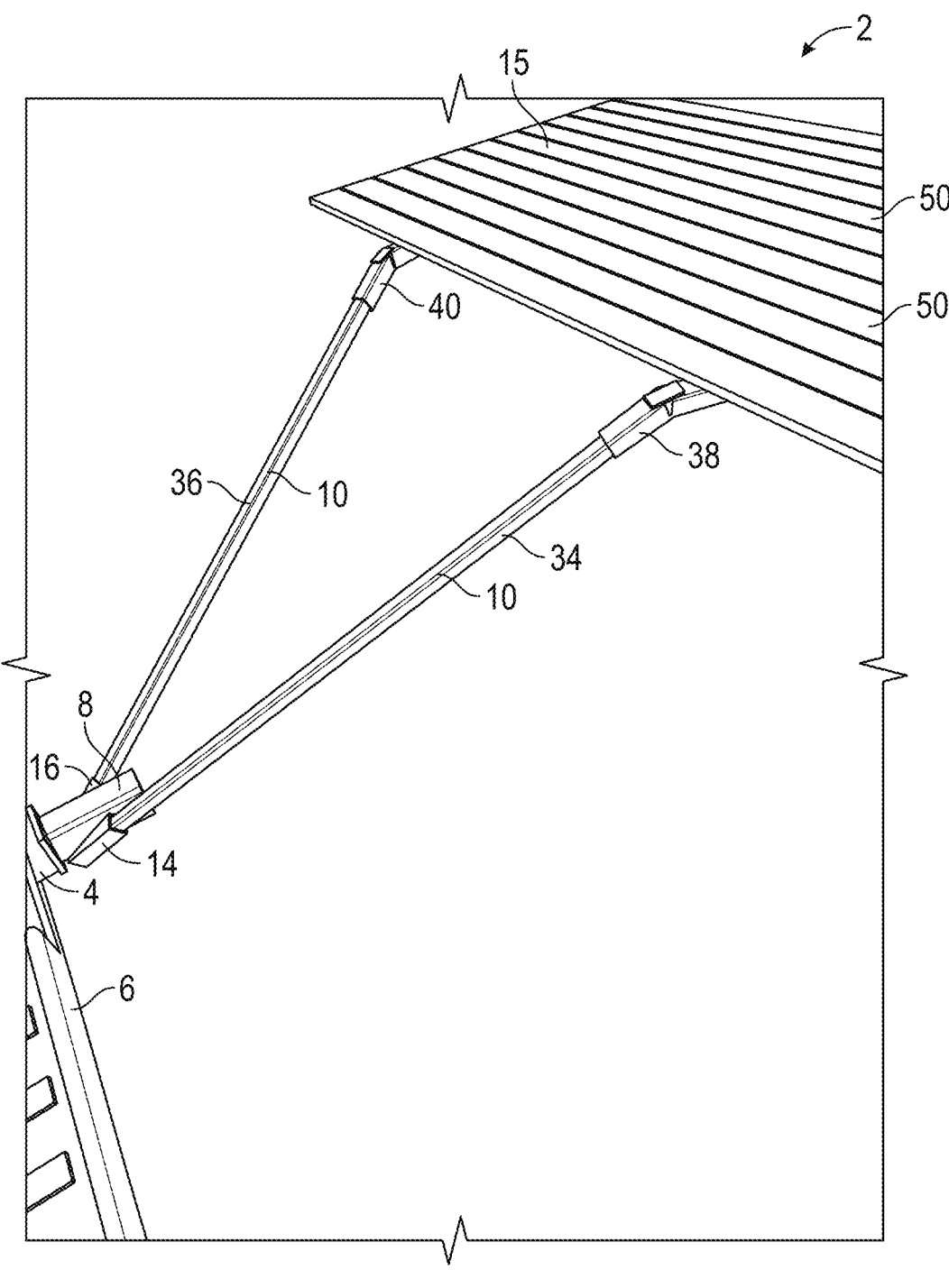
FIG. 1 is a perspective view of a first implementation of a table.
Figure 2:
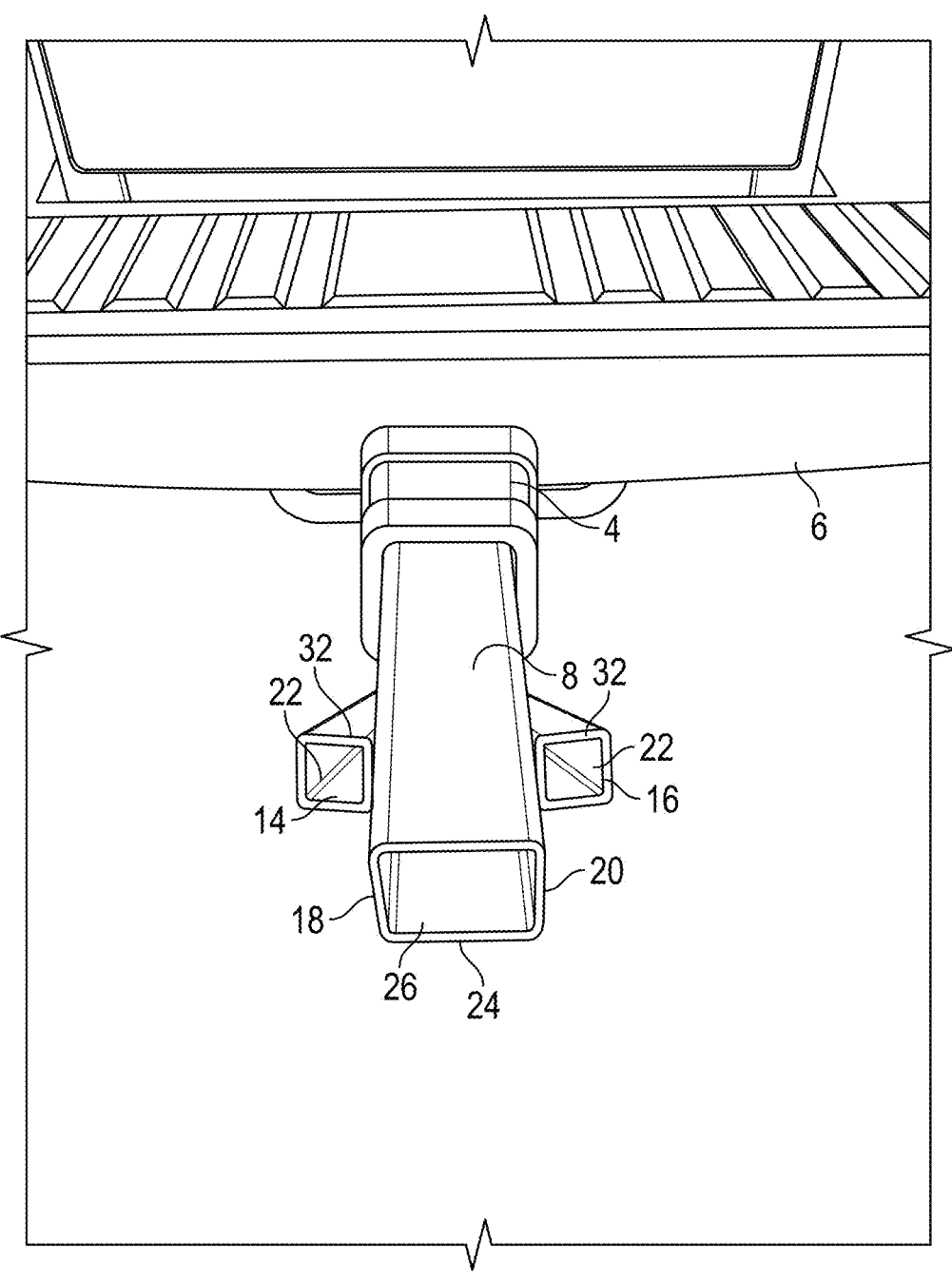
FIG. 2 is a perspective view of a shank coupled within a hitch receiver.
Figure 3:
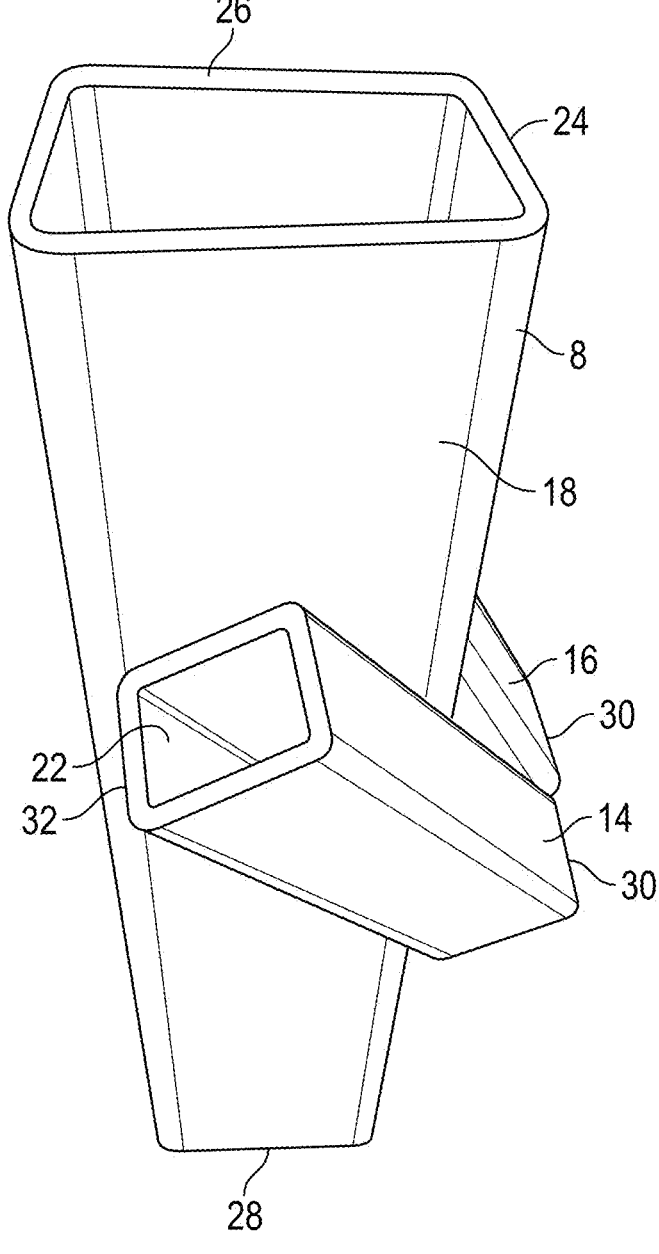
FIG. 3 is a perspective view of the shank of FIG. 2.
Figure 4:
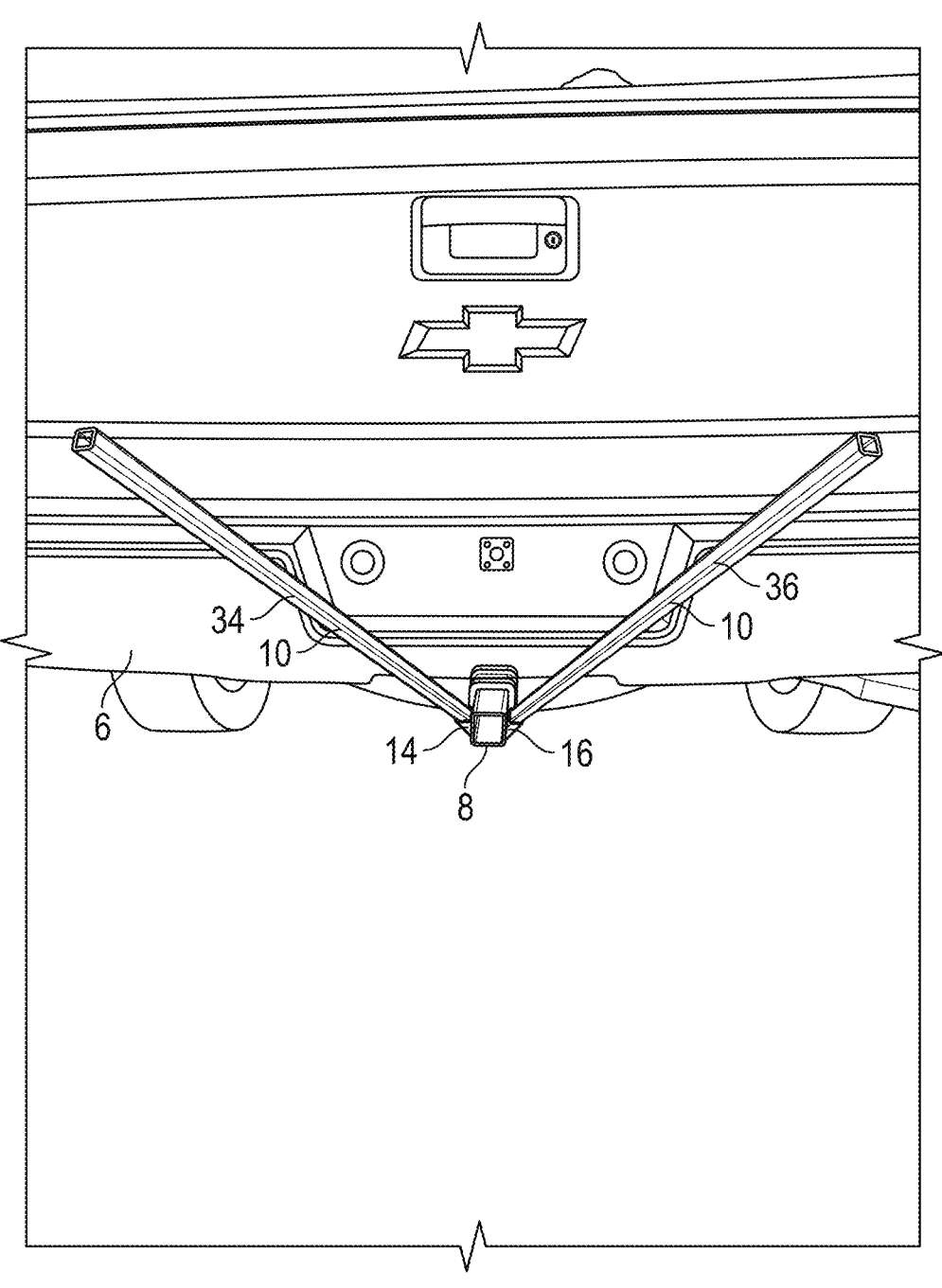
FIG. 4 is a perspective view of legs coupled to a shank.
Figure 5:
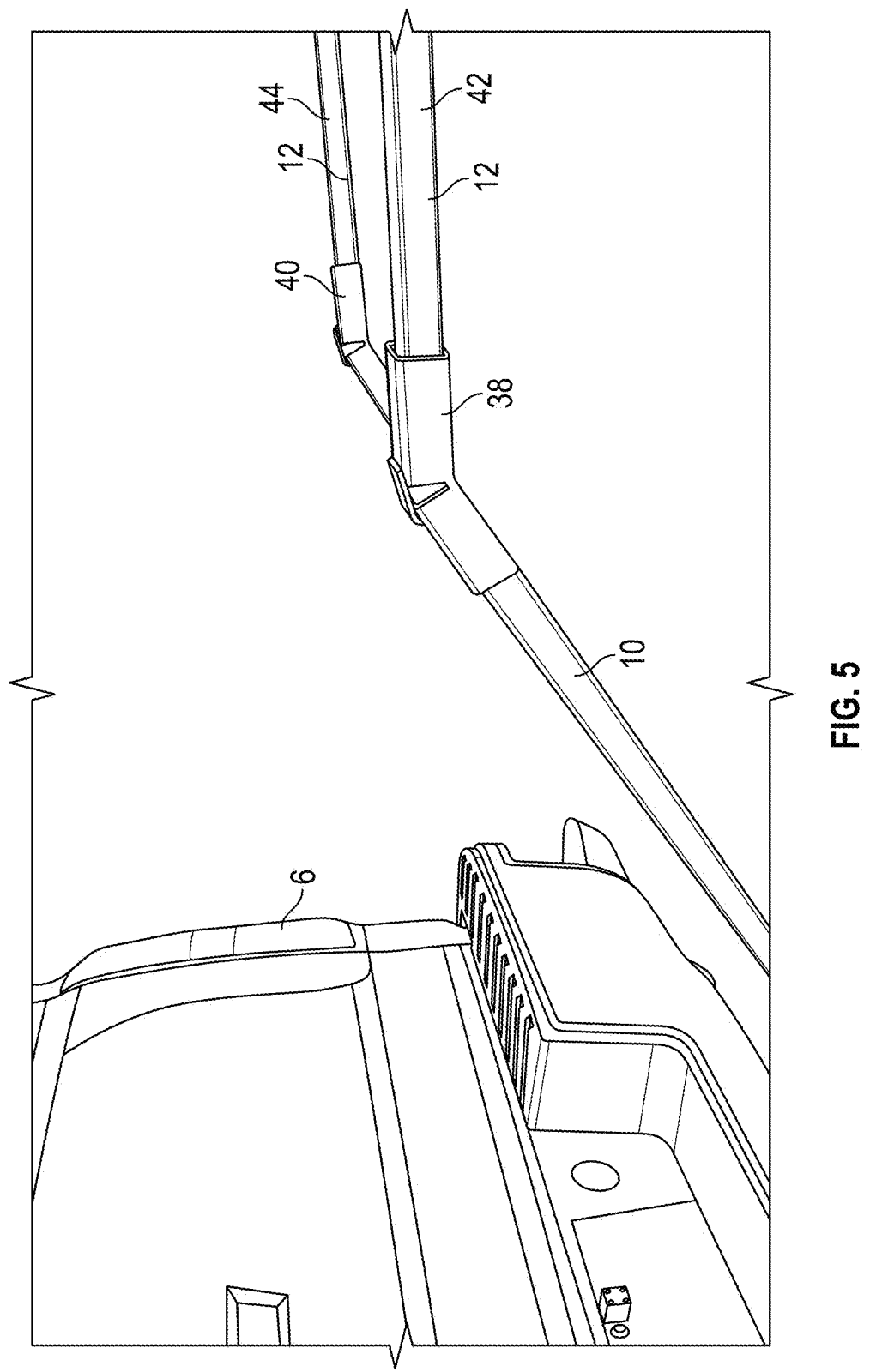
FIG. 5 is a side view of supports coupled to legs.
Figure 6:
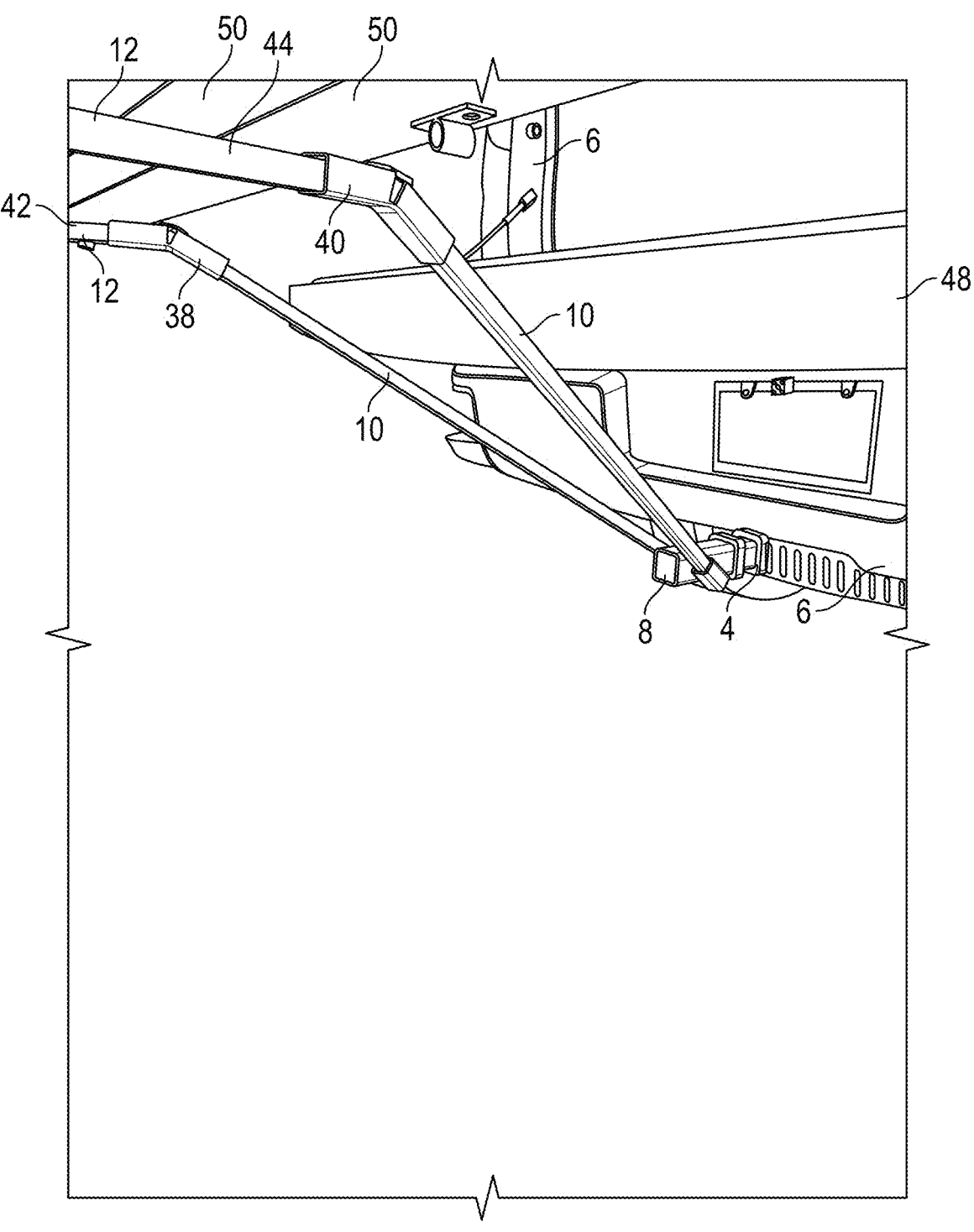
FIG. 6 is a bottom perspective view of supports coupled to legs.

Referring to FIGS. 1-6, a first implementation of a table is illustrated. The table 2 of FIGS. 1-6 is configured to couple within a hitch receiver 4 of a vehicle 6, such as, by non-limiting example, a truck or a side-by-side ATV (all-terrain vehicle) or UTV (utility task vehicle). While the hitch receiver is illustrated as attached to the rear of the vehicle, in other implementations the hitch receiver may be coupled to a side or front of a vehicle to enable the table to extend from the side or front of the vehicle. Referring to FIG. 1, a perspective view of the first implementation of the table 2 is illustrated. Referring to FIG. 2, a perspective view of a shank 8 coupled within a hitch receiver 4 is illustrated. Referring to FIG. 3, a perspective view of the shank 8 of FIG. 2 is illustrated. Referring to FIG. 4, a perspective view of legs 10 coupled to the shank 8 is illustrated. Referring to FIG. 5, a side view of supports 12 coupled to legs 10 are illustrated. Referring to FIG. 6, a bottom perspective view of supports 12 coupled to legs 10 are illustrated.

Referring specifically to FIG. 1, the table 2 includes a shank 8 configured to couple within a hitch receiver 4. The table also includes legs 10 configured to couple to the shank 8. The legs 10 are configured to couple to supports 12. The supports 12 are configured to support a platform 15 used as the upper surface of the table 2. As used herein, terms of direction or orientation, such as, by non-limiting example, upper, lower, top, bottom, upwards, downwards, above, and below are understood in relation to a table coupled within a hitch receiver of a vehicle on level ground.

The various pieces of the table may be made from, by non-limiting example, a metal, a metal alloy, a composite (such as carbon fiber), a plastic, any other polymer, or any combination thereof.

Referring specifically to FIG. 2, the shank 8 is illustrated within a hitch receiver. The shank may be sized to fit within a 1.25 inch hitch receiver, a two inch hitch receiver, a 2.5 inch hitch receiver, a 3 inch hitch receiver, or any other size of hitch receiver. Though not illustrated, in various implementations the shank may include an anti-rattle mechanism configured to expand the portion of the shank coupled within the hitch receiver to expand and press against the sidewalls of the interior of the hitch receiver, thus eliminating space between the hitch receiver and the shank and further securing the table 2 to the vehicle 6. In other implementations, the shank does not include an anti-rattle mechanism.

In various implementations, the shank 8 includes an opening therethrough configured to receive a hitch pin that locks the shank 8 within the hitch receiver 4. In implementations including the anti-rattle mechanism, the shank 8 may be sufficiently secured within the hitch receiver 4 through the anti-rattle mechanism and may not require a hitch pin to lock the shank 8 within the hitch receiver 4. In still other implementations, the shank 8 may include an anti-rattle mechanism and may also be configured lock within the hitch receiver 4 through a hitch pin.

Referring to FIGS. 2 and 3, a first leg receiver 14 and a second leg receiver 16 are illustrated. The first leg receiver 14 is directly coupled to a first side 18 of the shank 8 and the second leg receiver 16 is directly coupled to a second side 20 of the shank 8 opposite the first side. Each leg receiver includes an opening 22 in which a corresponding leg is configured to be inserted within. In various implementations, the openings 22 are blind and a closed end of the opening prevent the corresponding leg from extending all the way through the leg receiver. In other implementations, the openings 22 extend entirely through the leg receivers and the depth that a leg is allowed to extend with in the leg receiver may be controlled by a protrusion extending from the leg that is unable to fit within the opening 22 of the leg receiver.

The leg receivers may be angled downwards towards a back end 28 of the shank 8. As used herein, the back end 28 of the shank refers to the end that is inserted into the hitch receiver and the front end 26 is opposite the back end. In various implementations, the angle between each leg receiver and a horizontal plane touching a bottom of the leg receiver may be between 25 to 45°. In other limitations, the angle may be between 45 to 75°.

Still referring to FIGS. 2-3, the first leg receiver 14 and the second leg receiver 16 may be angled towards one another. In such implementations, the distance between the bottoms 30 of the leg receivers may be less than the distance between the tops 32 of the leg receivers. The first leg receiver 14 and the second leg receiver 16 may extend below a bottom surface 24 of the shank 8. In particular implementations, the first leg receiver 14 may contact the second leg receiver 16 below shank 8.

The shank 8 includes a volume of a rectangular cube extending from a perimeter of the front end 26 of the shank to a perimeter of the back end 28 of the shank. In various implantations, the first leg receiver 14, the second leg receiver 16, or both the first leg receiver and the second leg receiver may cut into the volume of the shank 8. In other implementations, the leg receivers may be entirely outside of the volume of the shank.

Referring to FIGS. 1 and 4, the table includes a first leg 34 configured to insert within the first leg receiver 14 and a second leg 36 configured to insert within the second leg receiver 16. In various implementations, each leg may be entirely straight. In other implementations, the legs may be curved or bent. The legs may be three feet long, more than three feet, or less than three feet.

In various implementations each leg may be configured to lock within a corresponding leg receiver. In such implementations, the legs may be configured to lock via a locking pin configured to extend through a pin opening within the leg receiver and also through an opening that is configured to align with the pin opening within the leg receiver. In other implementations, the legs may be cylindrical and include a threaded end configured to thread into a threaded opening of the leg receiver. In other implementations, the legs may lock into the corresponding leg receivers through a friction fit or other fastening mechanism. In still other implementations, the legs may not lock within the corresponding leg receivers but may be held in place within the leg receivers via gravity.

As illustrated by FIGS. 1, 5, and 6, the table includes a first elbow 38 and a second elbow 40. In various supplementations, the first leg 34 may be configured to removably lock within the first elbow 38 and the second leg 36 may be configured to removably lock within the second elbow 40. In such implementations, the legs may lock within the corresponding elbows using any locking mechanism disclosed herein. In other implementations, the legs may not lock within the elbows but the elbows may be secured to the legs through gravity. In still other implementations, the legs may be permanently fixed (such as, by nonlimiting example, through a weld) to the elbows.

In various implementations, the angle of the elbows may be such that the portion of the elbow configured to receive the table support may be parallel to the shank 8. In other implementations, the angle of the elbows may be such that the portion of the elbow configured to receive the table support may be angled downwards and away from the elbow. In such implementations, table supports may include leveling mechanisms configured to adjust the level the table support to ensure that the platform rest level on the table supports.

As illustrated by FIGS. 5-6, the table includes a first table support 42 and a second table support 44. In various supplementations, the first table support may be configured to removably lock within the first elbow 38 and the second table support 44 may be configured to removably lock within the second elbow 40. In such implementations, the table supports may be configured to lock within the corresponding elbows using any locking mechanism disclosed herein. In other implementations, the table supports may not lock within the elbows but the elbows may be secured to table supports through a friction fit. In still other implementations, the table supports may be permanently fixed (such as, by nonlimiting example, through a weld) to the elbows.

In various implementations, the first table support 42 and the second table support 44 may each include a straight bar. In other implementations, the first table support 42 and the second table support 44 may include curves or bends. The table supports may be 3 feet long. In other implementations, the table supports may be more than or less than 3 feet long.

In particular implementations, the table supports may each include a leveling mechanism. In such implementations, the table supports may include a first member and a second member that is rotatable relative to the first member. These leveling mechanisms may be the same as or similar to the leveling mechanisms illustrated in FIGS. 7-10. In implementations having leveling mechanisms, the height of the table supports may be adjustable and configured to raise and level a platform.

Referring to FIGS. 1 and 6, the table includes a platform 15 configured to rest upon the table supports 12. In various implementations, platform 15 may be configured to directly couple to the table supports 12 through, by nonlimiting example, magnets, clips, ties, or any other attachment mechanism. In various implementations, and as illustrated by FIGS. 1 and 6, the platform may include a plurality of slats 50. In particular implementations, the plurality of slats 50 include eight or more slats. In other implementations, the plurality of slats 50 may include less than eight slats. The slats 50 may be foldable relative to one another. In such implementations, the platform 15 may include hinges between each pair of slats. The hinges may include, by nonlimiting example, a wire or strap. In implementations where the slats 50 are foldable relative to one another, the platform may be configured to roll into a compact configuration for transportation of the table. In other implementations, the slats 50 may not be foldable relative one another but may all be independent and not tied to the other slats. In such implementations, each slat may be configured to attach to the table supports 12 through any attachment mechanism disclosed herein. In still other implementations, the platform 15 may not include a plurality of slats 50 but may include a single solid surface configured to rest on and attach to the table supports 12.

Referring to FIG. 6, the tailgate 48 of the vehicle 6 is down. In implementations of tables disclosed herein configured to be inserted within a hitch receiver, the legs 10 may be angled away from the vehicle in such a manner as to allow for the tailgate 48 to be lowered completely down without interfering with the platform 15 or the legs 10.

The implementations of tables disclosed herein configured to be inserted within a hitch receiver may be disassembled and a stored in a storage container such as a bag or a box. The storage container may be substantially thin inasmuch as the table supports, the legs, the slats, and the shank are all relatively straight elements that may be packaged together in a parallel manner that takes up a minimal amount of space. In such implementations, the table can be easily carried and stored while also having a lightweight structure that allows for a substantial load upon the table. The table may weigh less than 15 pounds, less than 10 pounds, or any other weight.

Figure 7:
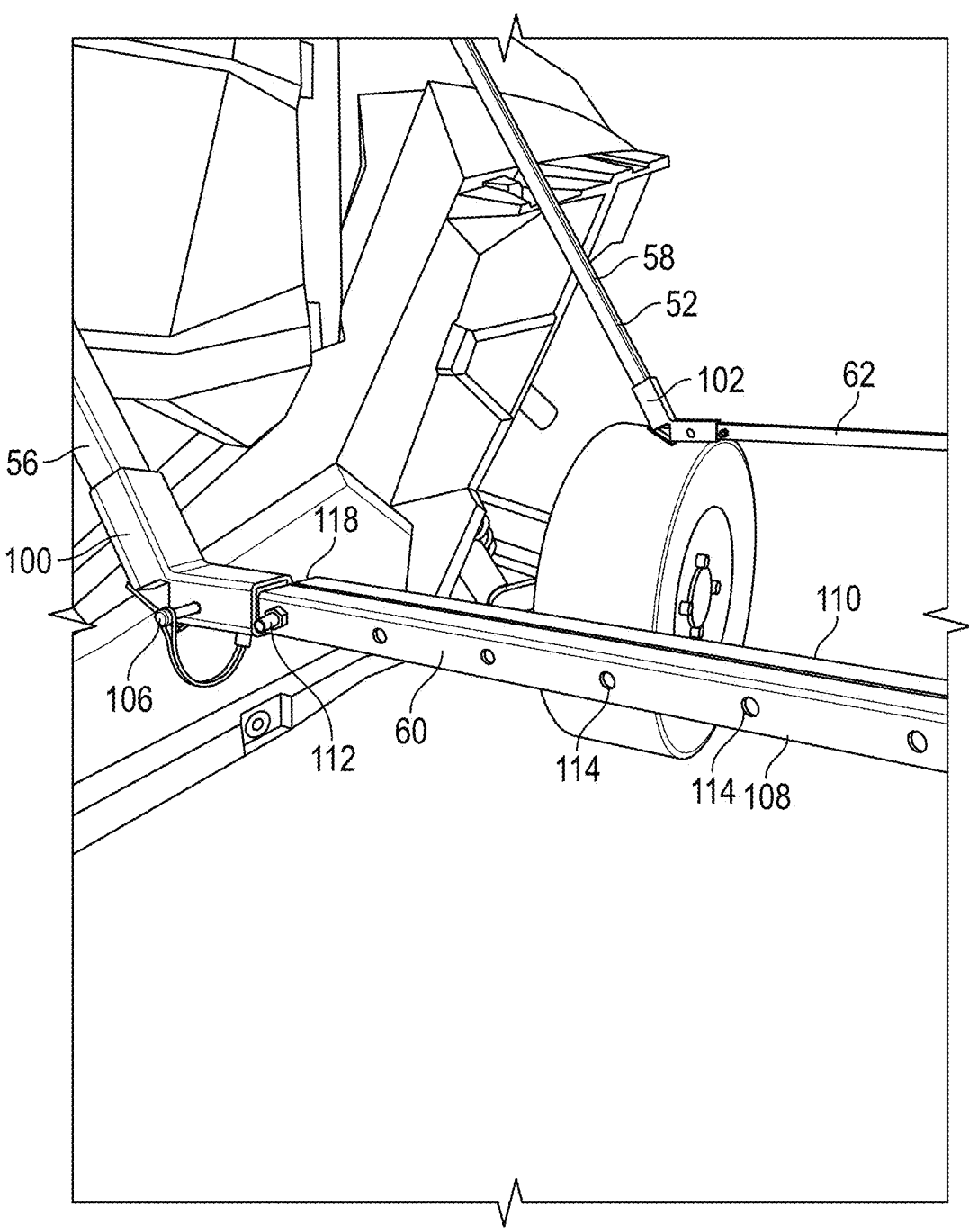
FIG. 7 is a perspective side view of a second implementation of a table.

Referring to FIGS. 7-10, a second implementation of a table 52 is illustrated. The table 52 of FIGS. 7-10 is configured to couple directly to a roll cage 54 of an ATV or UTV, including side-by-side ATVs or UTVs. Referring to FIG. 7, a perspective side view of the second implementation of the table 52 is illustrated. The table includes a first arm 56 and second arm 58. The first arm 56 and the second arm 58 are configured to couple to the roll cage 54 and extend downwards towards a first table support 60 and the second table support 62. The table 52 also includes a platform coupled over the table supports, though the platform is not illustrated FIGS. 7-10. The platform of table 52 with the same as the platform described in FIGS. 1-6.

Figure 8:
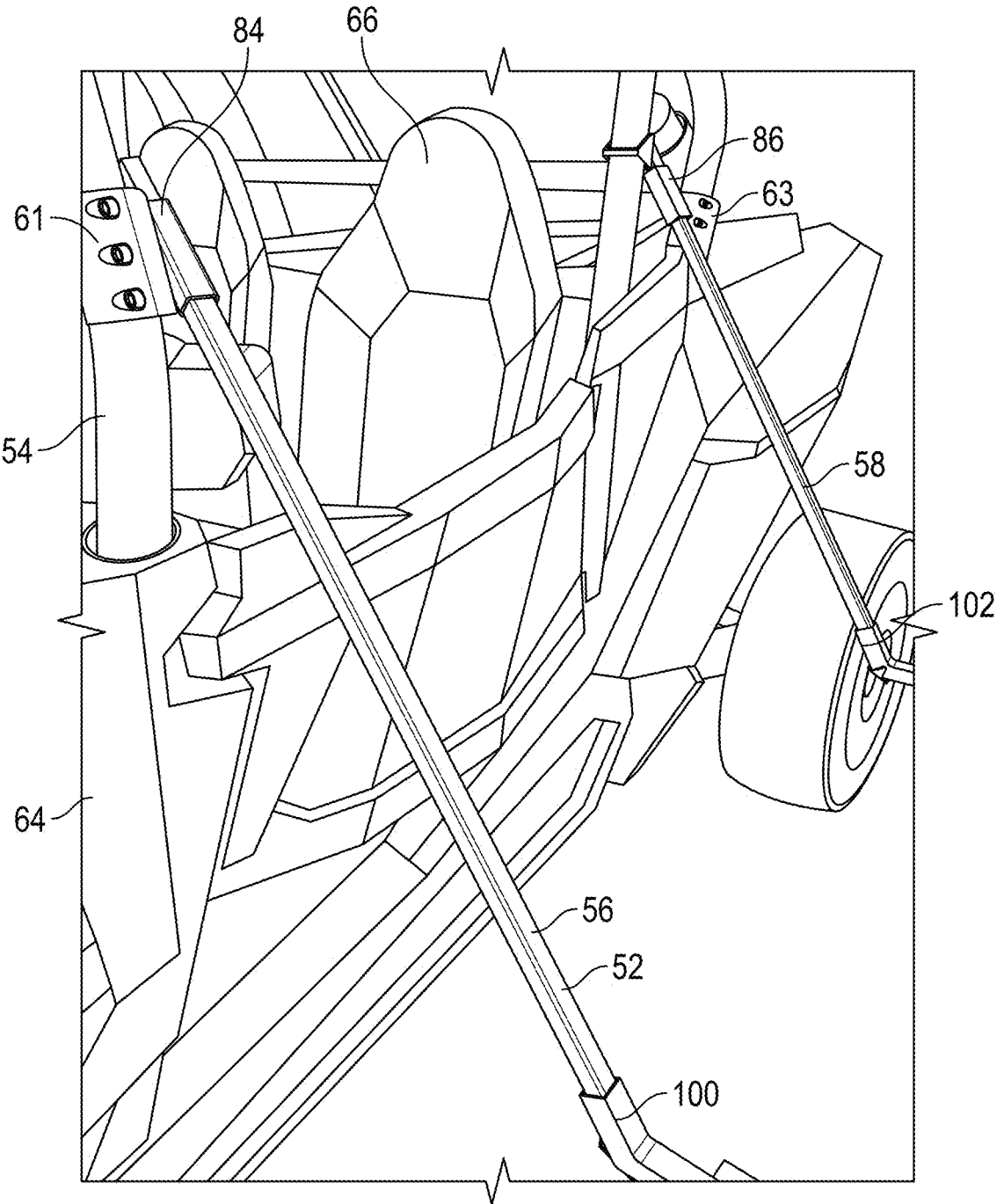
FIG. 8 is a perspective side view of arms of the table of FIG. 7.

Referring to FIG. 8, a perspective side view of arms of the table of FIG. 7 is illustrated. The first arm 56 is coupled to the located through a first clamp 61 and the second arm 58 is coupled to the located through a second clamp 63. The clamps are configured to directly couple to upright pillars of the roll cage 54. In particular implementations, the first clamp 61 is configured to attach to a pillar in front of a front seat 66 of the vehicle 64 and the second clamp 63 is configured to attach to a pillar behind the front seat 66. In implementations of the multiple pillars while the front seat 66, the second clamp 63 may be configured to couple to any of the pillars behind the front. In other implementations, both the first clamp 61 and the second clamp 63 may be coupled to pillars behind the front seat 66. In other implementations, the first clamp and the second clamp may be coupled to any other two pillars of the roll cage.

Figure 14:
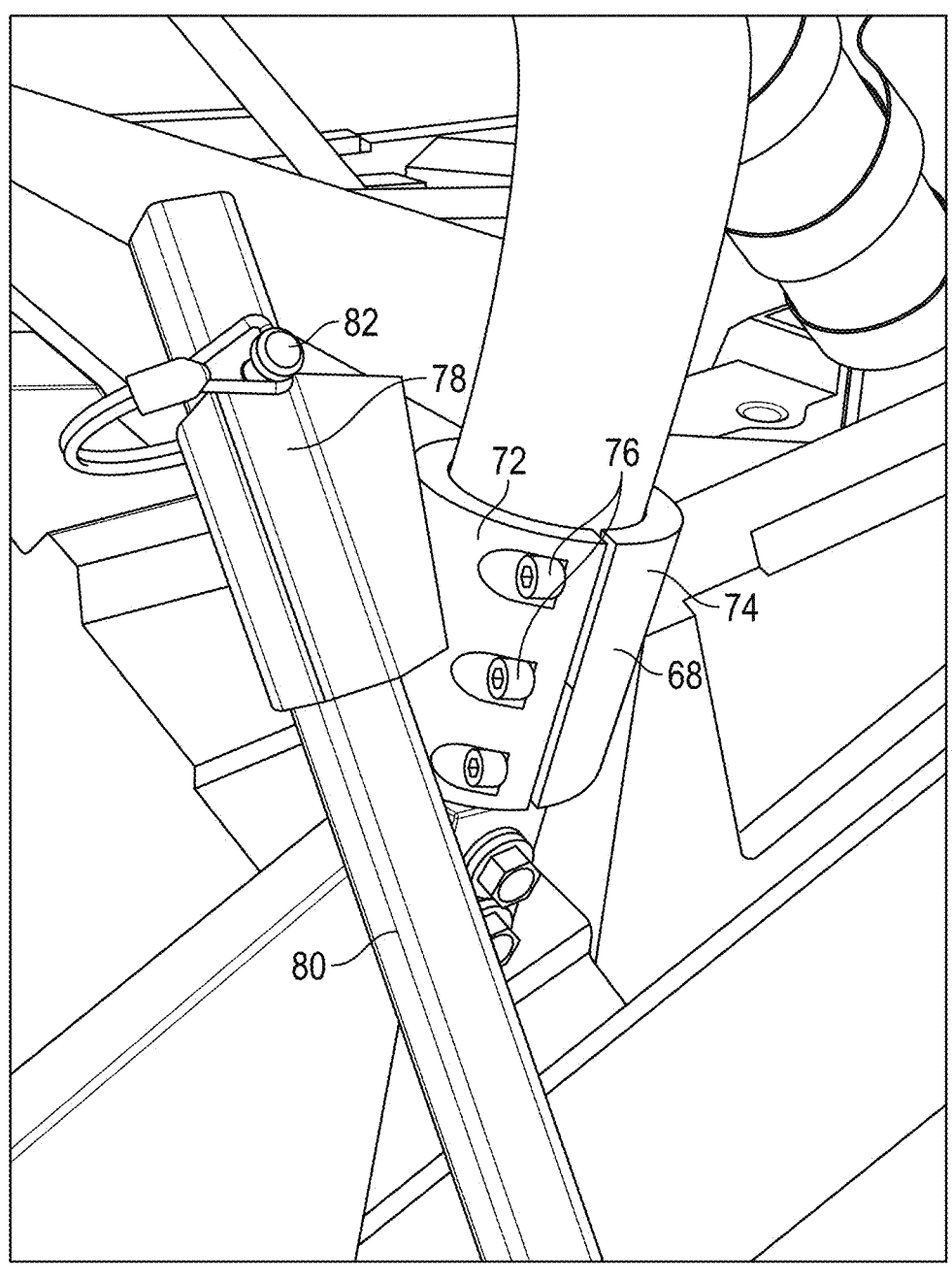
FIG. 14 is a magnified view of an arm coupled within an arm receiver of a clamp.
Figure 15:
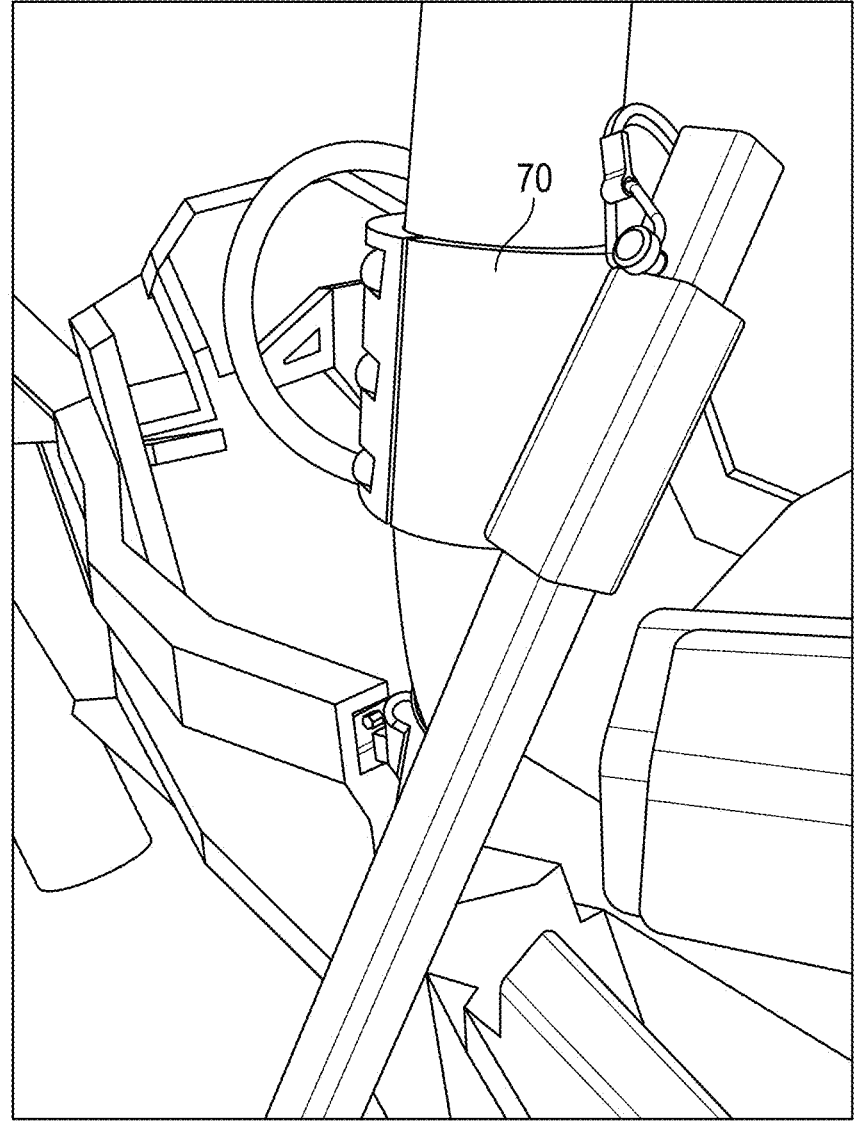
FIG. 15 is a magnified view of an arm coupled within an arm receiver of a second implementation of a clamp.

Referring to FIG. 14, a magnified view of an arm coupled within the arm receiver of a clamp is illustrated. Referring to FIG. 15, a magnified view of an arm coupled within an arm receiver of a second implementation of a clamp is illustrated. Both clamp 68 of FIG. 14 and clamp 70 of FIG. 15 are attached to pillars of a roll cage and behind a front seat. The clamps of the table configured to attach to a roll cage may include a first portion 72 and a second portion 74 represented by the clamp 68 in FIG. 14. The first portion 72 and second portion 74 each form a semi-cylinder. The portions may be fastened together to securely attached to the roll cage. In particular implementations, clamp 68 may include one or more bolts 76 that attach the first portion 72 to second portion 74 and secures the table to the vehicle. In other implementations, other fastening mechanisms aside from bolts may be used. The clamp 68 attaches to the roll cage through pressure applied to the roll cage the of the fastening mechanism squeezing roll cage between the first portion and 72 and the second portion 74.

Referring to FIGS. 8, 14, and 15, the clamps all include an arm receiver fixedly attached to either the first portion or the second portion of the clamp. While reference is made specifically to FIG. 14, the arm receivers of FIGS. 8 and 15 are similar to or the same as the arm receiver of FIG. 14. Referring specifically to FIG. 14, the arm receiver 78 is configured to receive a corresponding arm 80 of the table. In various implementations, the openings within the arm receiver are blind and a closed end of the opening prevents the arm 80 from extending all the way through the arm receiver 78. In other implementations, and as illustrated by FIG. 14, the opening within the arm receiver 78 extends entirely through the arm receiver. In various implementations, the arm 80 may be configured to lock within the arm receiver 78. In such implementations, the arm may be configured to lock via a locking pin 82 configured to extend through a pin opening within the arm 80. In other implementations, the arm may be cylindrical and include a threaded end configured to thread into a threaded opening of the arm receiver. In still other implementations, the arm may be configured to lock into the arm receivers through some other fastening mechanism.

Referring specifically to FIG. 8, the angle between the length of the arm receiver 84 (and in turn, the first arm 56) and the portion of the roll cage coupled within the first clamp may be less than the angle between the length of the arm receiver 86 (and in turn, the second arm 58) and the portion of the roll cage coupled within the second clamp 63. When the pillar the first clamp 61 is attached to has a different angle than the pillar the second clamp 63 is attached to, the angles may be different to allow for the arms to extend downwards parallel to one another and provide a level surface for the table. In other implementations, the angles may not differ between the arm receivers and respective pillars.

As illustrated by FIGS. 8, 14 and 15, the arm receivers may be non-rotatably fixed to the remainder of the clamp. In other implementations, the arm receivers may be rotatably attached to the remainder of the clamp and may be rotated and locked at a certain angle to allow the first arm and the second arm to descend to the table supports parallel to one another.

Figure 11:
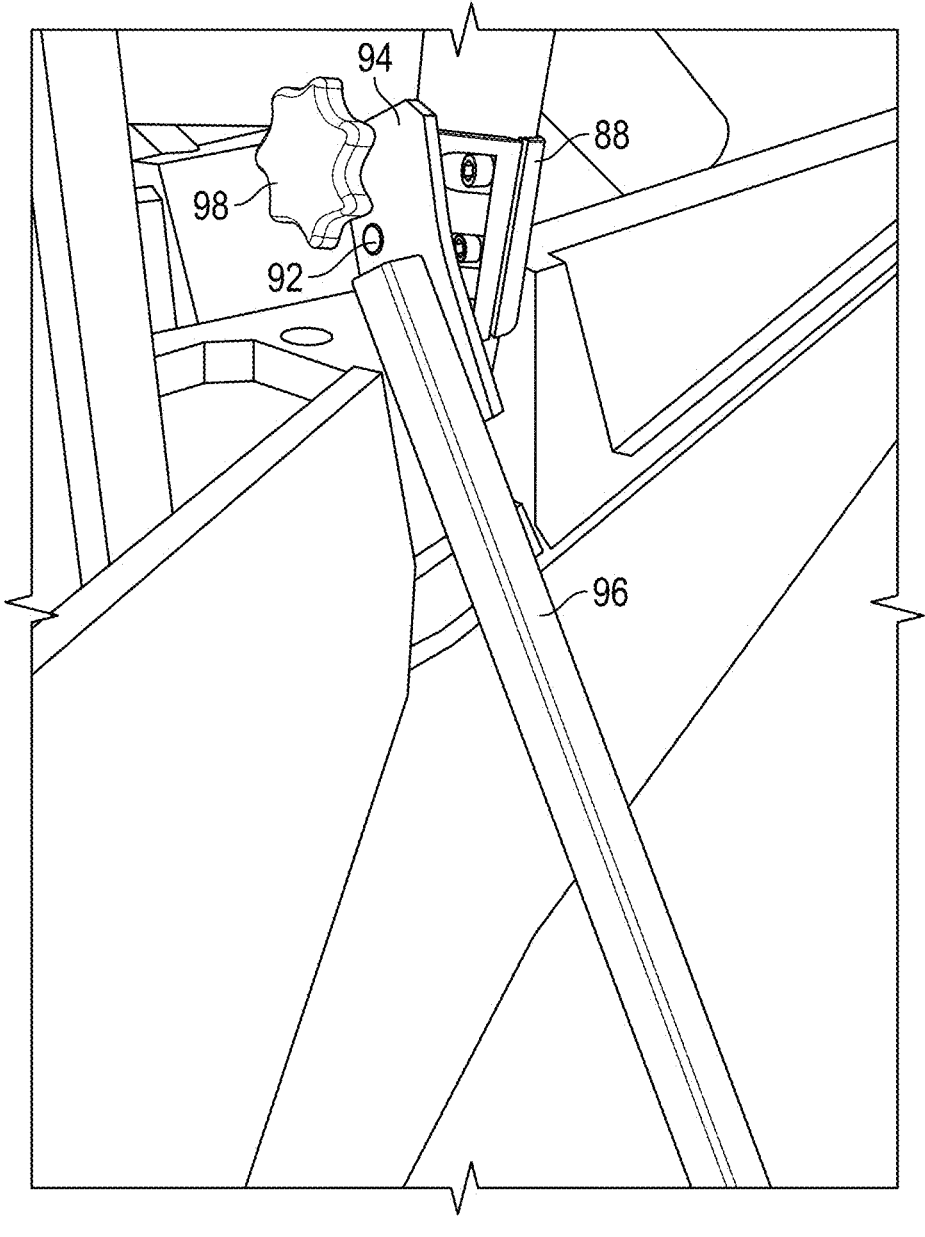
FIG. 11 is a magnified view of an arm attached to a clamp.
Figure 12:
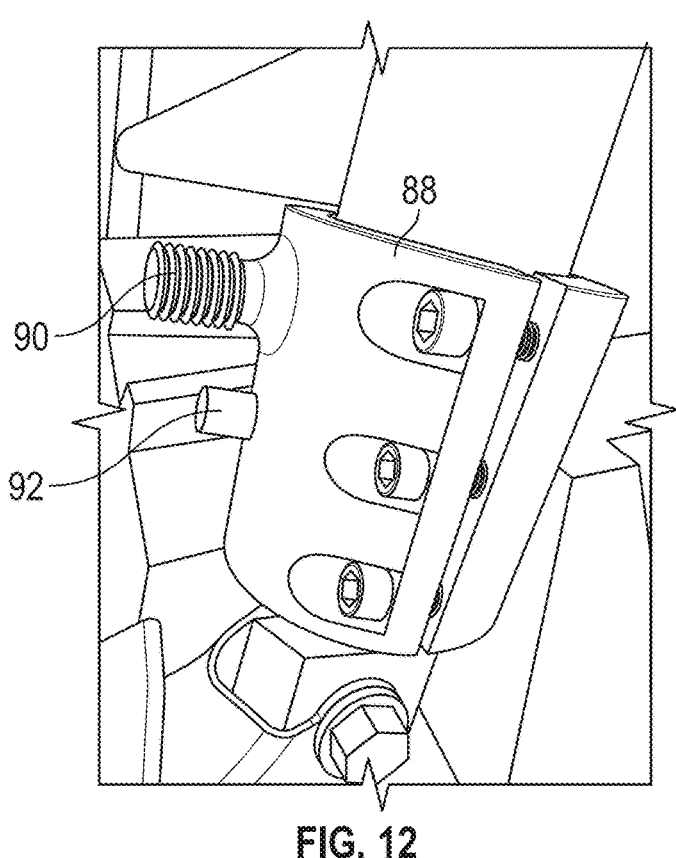
FIG. 12 is magnified view of the clamp of FIG. 11.
Figure 13:
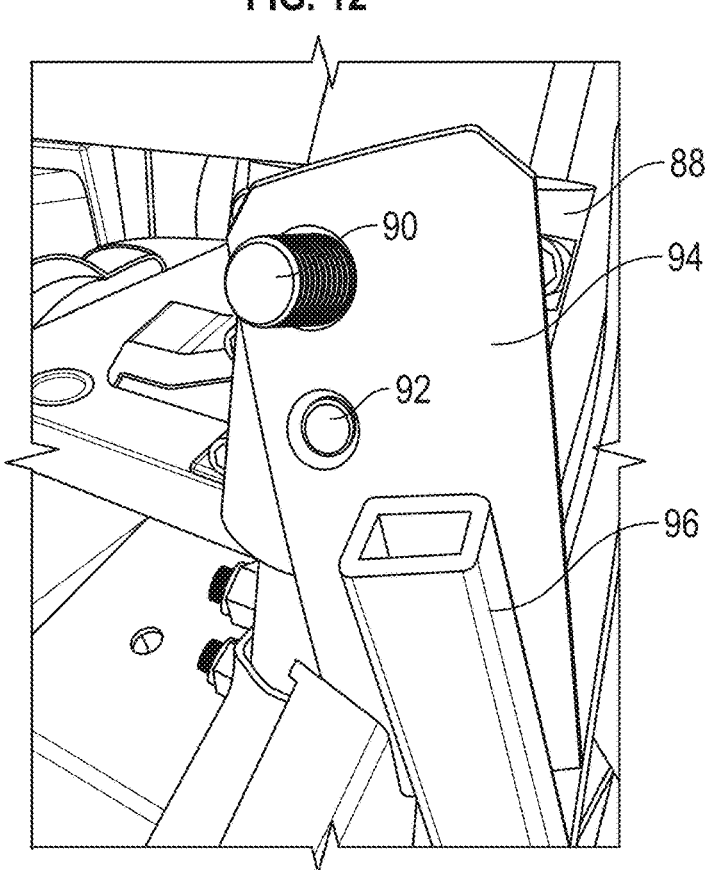
FIG. 13 is a magnified view of a bracket coupled to the clamp of FIG. 11.

Referring to FIGS. 11-13, a second implementation of a clamp is illustrated that may be used with any tables disclosed herein that attach to a roll cage. While the clamp of FIGS. 11-13 includes the first portion and the second portion coupled together through the bolts, rather than the clamp including an arm receiver, the clamp is configured to attach to a bracket coupled to an end of the arm. Referring specifically to FIG. 11, a magnified view of an arm attached to a clamp is illustrated. Referring specifically to FIG. 12, magnified view of the clamp of FIG. 11 is illustrated. Referring specifically to FIG. 13, a magnified view of a bracket coupled to the clamp of FIG. 11 is illustrated. The clamp 88 includes a first protrusion 90 and a second protrusion 92. In various implementations, and as illustrated, the first protrusion 90 may be threaded and of larger than the second protrusion 92. In other implementations, the second protrusion 92 may be threaded and larger than the first protrusion 90.

Still referring to FIGS. 11-13, the table includes a bracket 94 directly coupled to an end of the arm 96. The bracket 94 includes a first opening configured to receive the first protrusion 90 and a second opening configured to receive the second protrusion 92. Because the two protrusions extend through two openings, rotation of the bracket (and arm 96) is fixed in a desired orientation.

As illustrated by FIG. 11, the clamp 88 may include a locking mechanism 98 configured to lock the bracket 94 to the clamp 88. In various implementations, the locking mechanism may include a handle with a threaded opening configured to thread onto the threaded protrusion and sandwich the bracket between the locking mechanism 98 and the remainder of the clamp 88.

In other implementations, tables may include other styles of clamps configured to attach to both a roll cage and an arm. By non-limiting example, other examples of clamps include an arm welded directly to a clamp.

Referring to FIG. 8, a perspective side view of arms of the table of FIG. 7 is illustrated. In various implementations, the entire length of the first arm 56 and the second arm 58 may be straight. In other implementations, the length of the first arm 56 and the length of the second arm may be curved or bent. The first arm 56 and the second arm 58 are configured to extend downwards towards the first table support and the second table support when the first arm 56 and the second arm 58 are coupled to the roll cage 54 through the first clamp 61 and the second clamp 63. In various implementations the length of the first arm 56 and second arm 58 may be two feet, more than two feet, or less than two feet. In implementations where the first arm 56 and the second arm 58 are configured to extend entirely through arm receivers, various amounts of the lengths of the arm may be configured to extend entirely through the corresponding receivers and then lock in place, through, by non-limiting example, a pin, a clamp, or other locking mechanism. In such implementations, the height of the table and the level of the table may be adjusted by adjusting the length of the arm that extends below the receiver.

Figure 9:
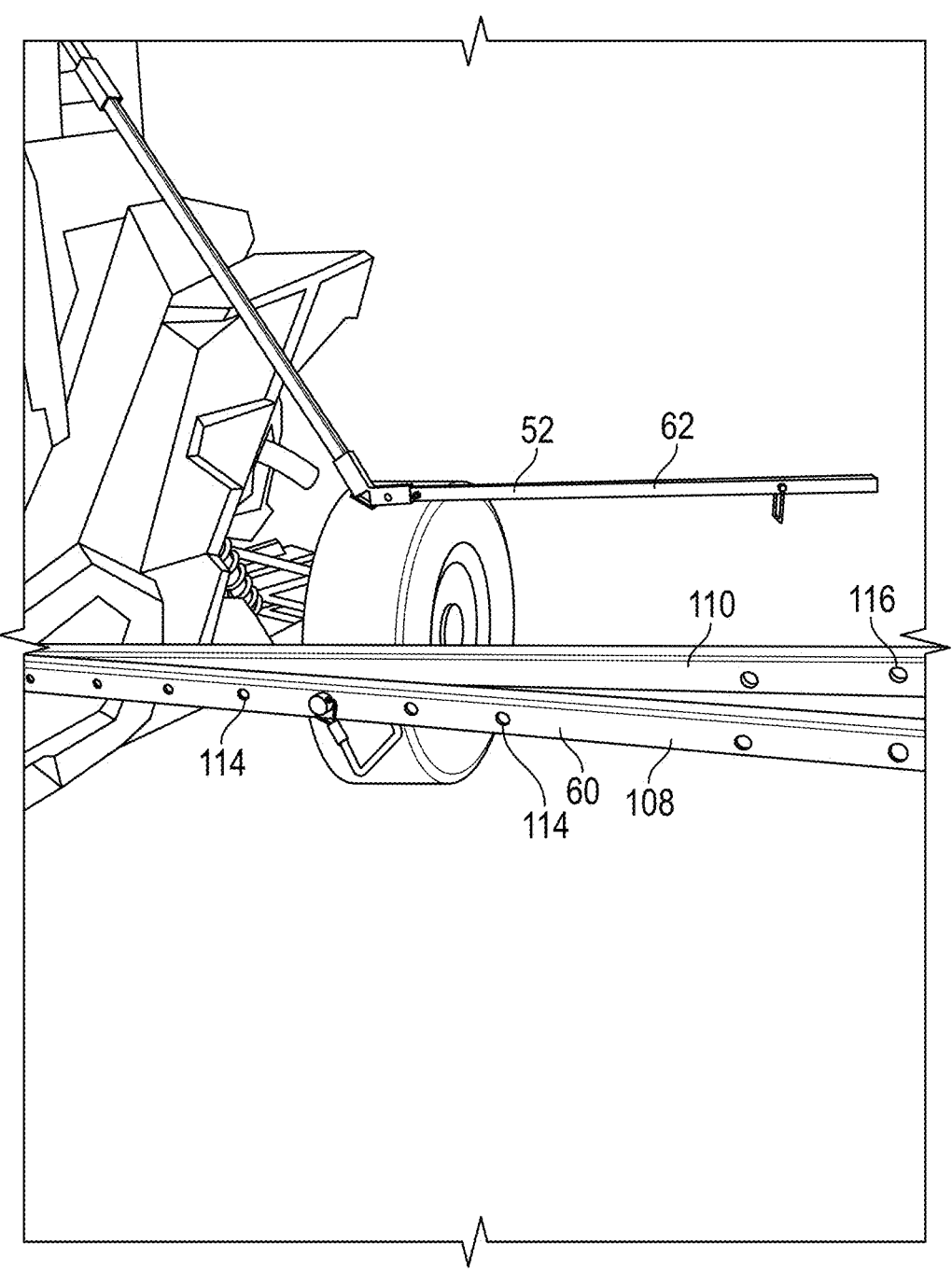
FIG. 9 is a side view of supports of the table of FIG. 7.

The table 52 includes a first elbow 100 and a second elbow 102. Referring to FIG. 9, a magnified view of an elbow of the table of FIG. 7 is illustrated. In various supplementations, the first arm 56 may be configured to removably lock within the first elbow 100 and the second arm 58 may be configured to removably lock within the second elbow 102. In such implementations, the arms may lock within the corresponding elbows using any locking mechanism disclosed herein. In still other implementations, the arms may be permanently fixed (such as, by nonlimiting example, through a weld) to the elbows.

In various implementations, the angle of the elbows may be such that the portion of the elbow configured to receive the table support may be substantially horizontal. In other implementations, the angle of the elbows may be such that the portion of the elbow configured to receive the table support may be angled downwards and away from the elbow. In such implementations, table supports may include leveling mechanisms configured to adjust the level the table support to ensure that the platform rest level on the table supports.

As illustrated by FIGS. 7 and 9, the table includes a first table support 60 and a second table support 62. In various supplementations, the first table support 60 may be configured to removably lock within the first elbow 100 and the second table support 62 may be configured to removably lock within the second elbow 102. In such implementations, the table supports may be configured to lock within the corresponding elbows using any locking mechanism disclosed herein (such as through locking pin 106). In still other implementations, the table supports may be permanently fixed (such as, by nonlimiting example, through a weld) to the elbows.

In various implementations, the first table support and the second table support may each include a single straight bar. In other implementations, the first table support and the second table support may include curves or bends. The table supports may be 3 feet long. In other implementations, the table supports may be more than or less than 3 feet long.

In particular implementations, and as illustrated by FIGS. 7 and 9, the table supports may each include a leveling mechanism. In such implementations, the first table support 60 may include a first member 108 and a second member 110 that is rotatable relative to the first member 108. In such implementations, the first member 108 may be rotatably attached to the second member 110 through a bolt 112. In various implementations, the first member may include a plurality of openings 114. The second member 110 may also include at least one opening 116 that aligns with one opening of the plurality of openings 114 within the first member 108. The first member 108 may be coupled to the second member in a parallel orientation through a pin extending through the opening 116 and a corresponding opening within the first member. If the level of the table support 60 needs to be adjusted, the pin through opening 116 can be removed and inserted through any of the plurality of openings 114 through the first member 108. The second member 110 can then be rotated upwards so the bottom surface of the second member rests upon the pin inserted through the opening of the plurality of openings 114.

Figure 10:
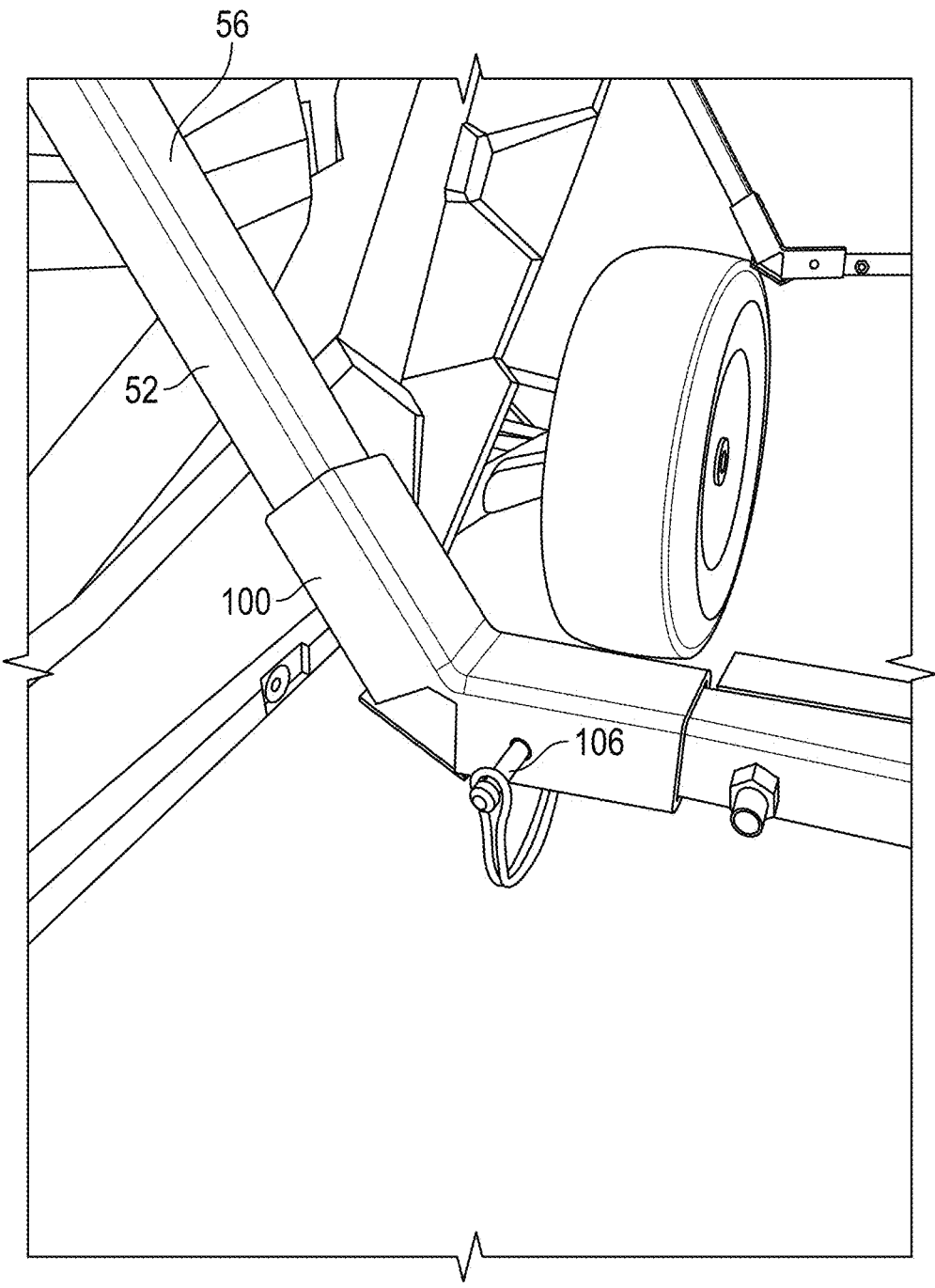
FIG. 10 is a magnified view of an elbow of the table of FIG. 7.

In other implementations, rather than bolt of FIG. 10 securing the first member 108 to the second member 110, a pin may be used in place of the bolt. In such implementations, either this pin or a pin attached to the opposite end of the table support may be used as the pivot points and either the first end 118 of the second member closest to the elbow or the second end of the second member may be raised in a manner that provides a level surface that the platform will rest upon.

In other implementations, other types of leveling mechanisms may be used to level the table supports. The leveling mechanism of the second table support may be the same as the leveling mechanism of the first table support.

The table 52 includes a platform configured to rest upon the first table support 60 and the second table support 62. The platform may be the same as any other platform disclosed herein.

While the table 52 is described as attaching to a roll cage, in other implementations, the table 52 may be configured to attach to other portions of a vehicle, such as, by non-limiting example, a cattle guard or a bumper guard on a front of a vehicle. In such implementations, the arms, elbows, and clamps may all be configured to attach a table to particular portions of a cattle guard, bumper guard, or other portion of a vehicle which results in a table at a desired height.

The implementations of tables disclosed herein configured to be attached to a roll cage may be disassembled and a stored in a storage container such as a bag or a box. The storage container may be substantially thin inasmuch as the table supports, the arms, and the slats are all relatively straight elements that may be packaged together in a parallel manner that takes up a minimal amount of space. In such implementations, the table can be easily carried and stored while also having a lightweight structure that allows for a substantial load upon the table. The table may weigh less than 15 pounds, less than 10 pounds, or any other weight.

Figure 16:
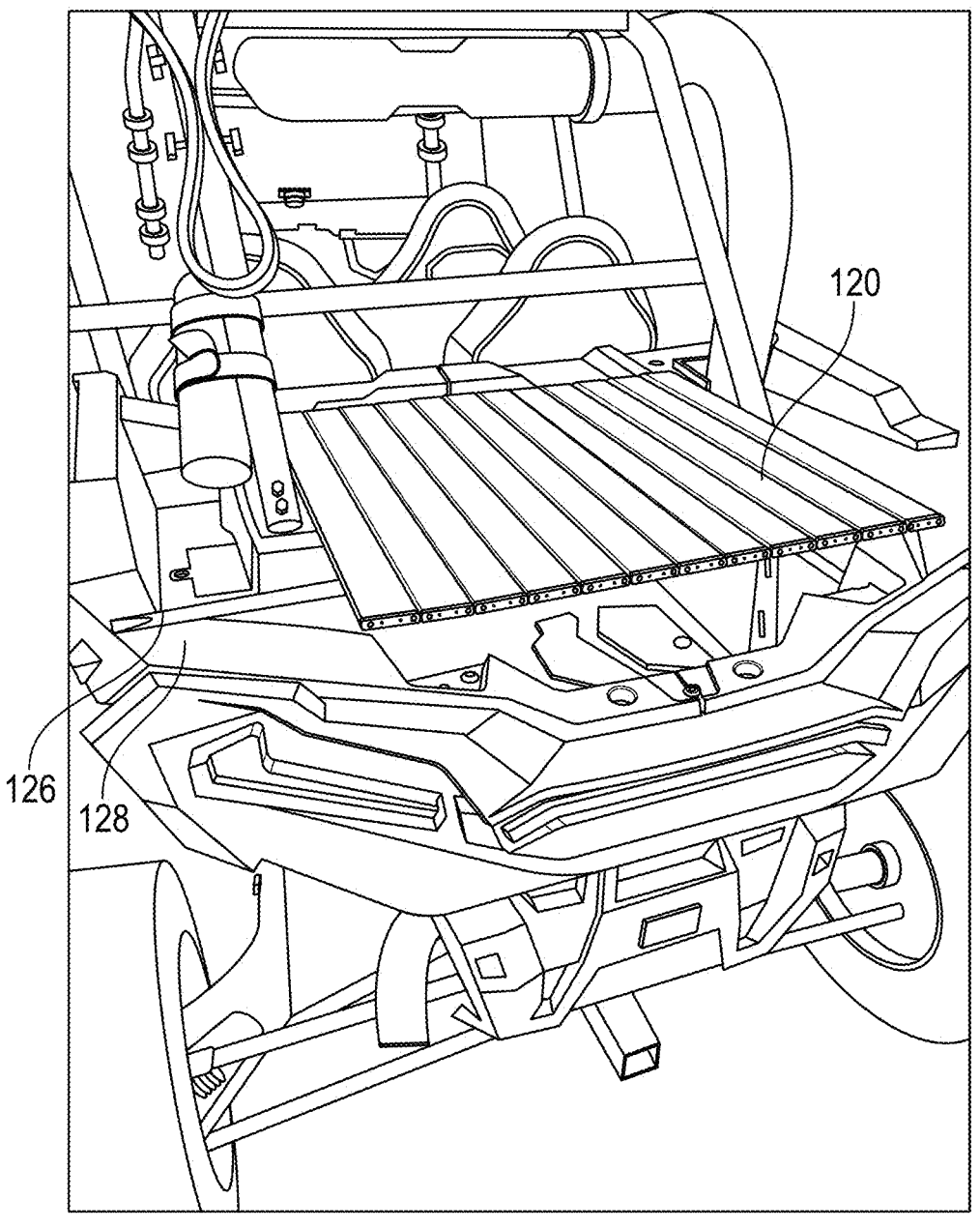
FIG. 16 is a perspective front view of a third implementation of a table.
Figure 17:
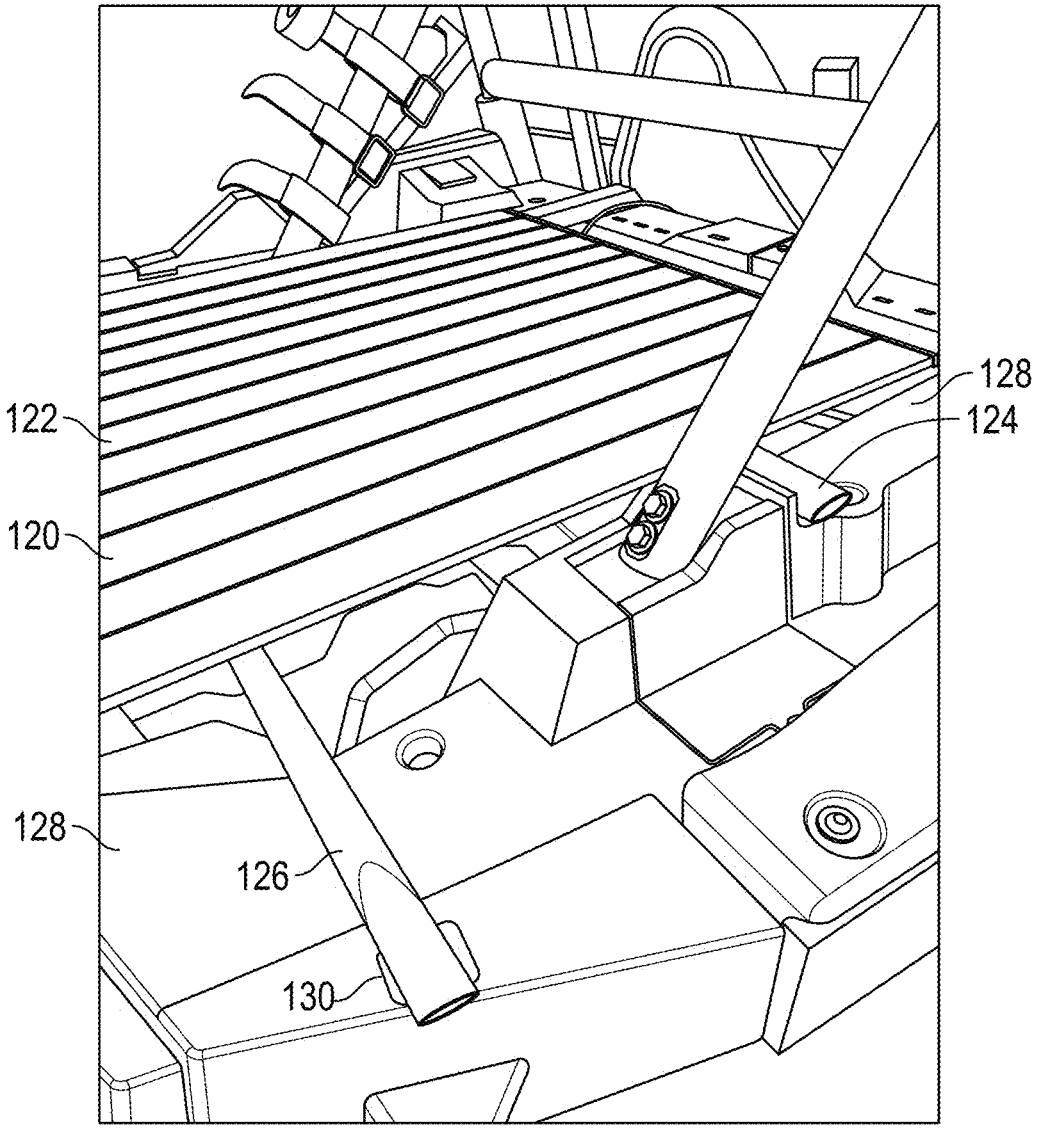
FIG. 17 is a perspective side view of the table of FIG. 16.
Figure 18:
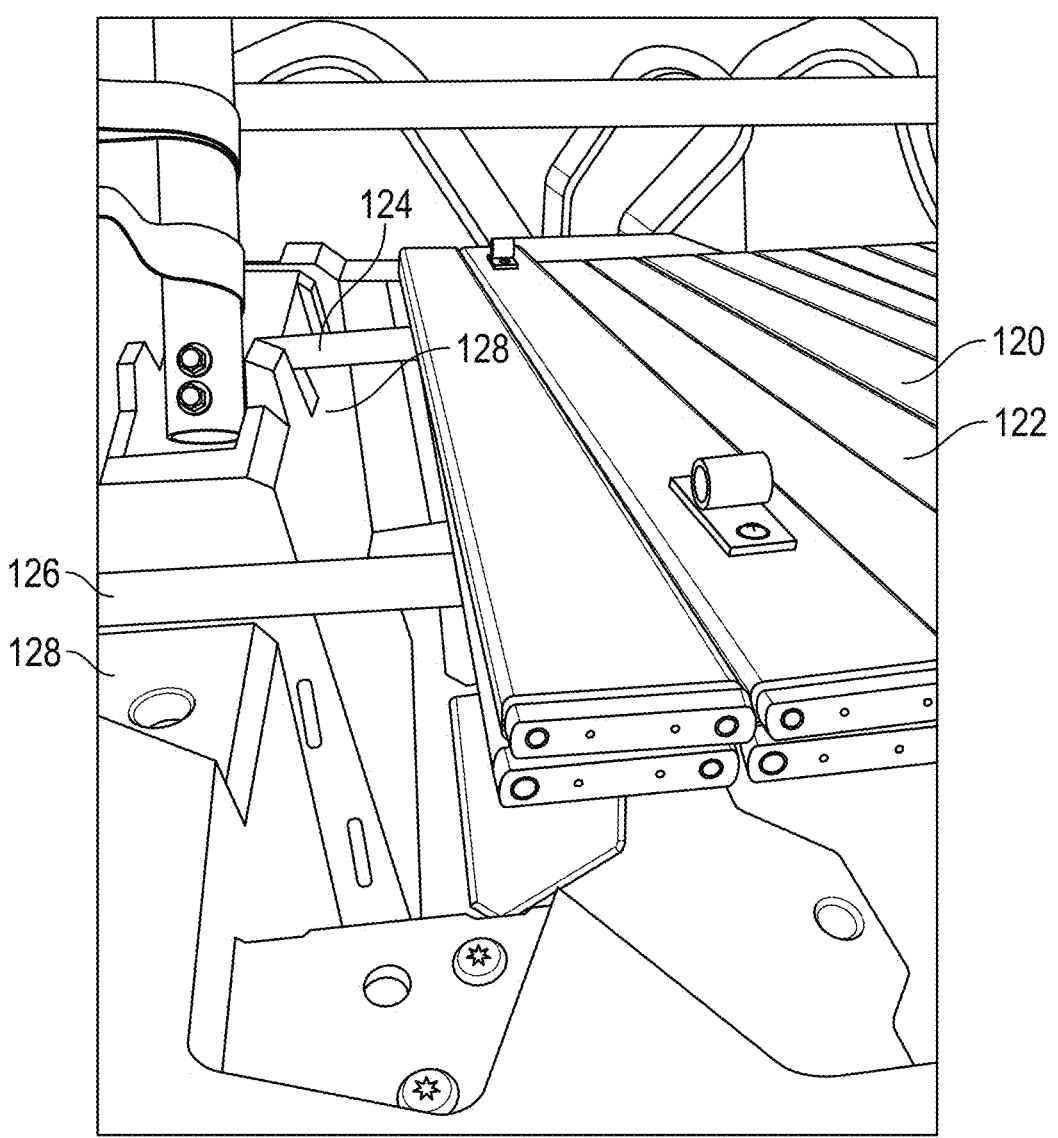
FIG. 18 is a perspective side view of the table of FIG. 16 with part of the table folded back.

Referring to FIGS. 16-18, a third implementation of a table is illustrated. Referring to FIG. 16, a perspective front view of a third implementation of a table is illustrated. Referring to FIG. 17, a perspective side view of the table of FIG. 16 is illustrated. Referring to FIG. 18, a perspective side view of the table of FIG. 16 with part of the table folded back is illustrated. In various implementation, the table 120 may be configured to fit within a bed of a side-by-side ATV or UTV. The table includes a platform 122 configured to rest upon a first table support 124 and a second table support 126. The platform of table 120 may be the same as any other platform disclosed herein and may also be sized to fit within the bed of the side-by-side ATV or UTV. In various implementations, the first table support 124 and the second table support 126 may each extend over and across two portions of a frame 128 of the bed lining. The first table support 124 and the second table support 126 may run from side-to-side of the vehicle (perpendicular to a front-to-back direction). The first table support 124 may be closest to the front of the vehicle and the second table support 126 may be closest to the rear of the vehicle. In various implementations, the first table support 124 and the second table support may each be configured to fit within a corresponding groove of the frame 128. In other implementations, the first table support 124 and the second table support 126 may each be configured to attach to the frame 128 through a different fastening mechanism, such as a screw, bolt, pin, magnet, clamp, or other fastening mechanism. In implementations having a clamp, the clamps may be fixedly attached to bed frame and may be configured to receive the first table support 124 and the second table support 126. In such implementations, the clamps may include elastic properties and the table supports may fit within the clamps via a pressure fit provided through the clamps elastic properties.

Figure 19:
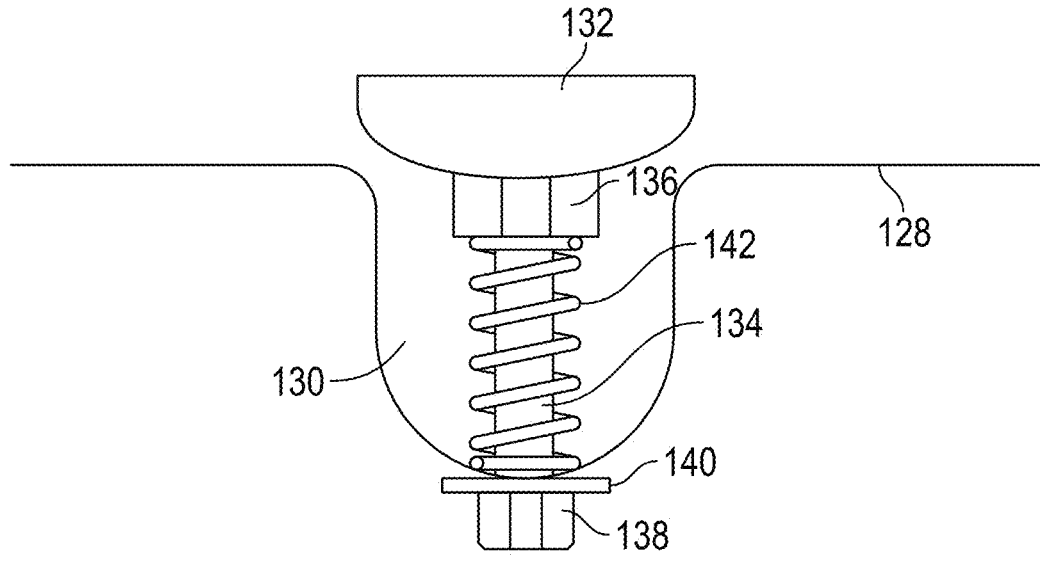
FIG. 19 is a side view of an attachment mechanism for the table of FIG. 16.

In particular implementations, as illustrated by FIG. 17, the bed frame may include a recess 130 therein. The recess may be an existing recess within the bed frame or may be added to the bed frame specifically for the table support. In particular implementations, a magnet may be secured to a bed frame through a bolt or rod fixed within the recess 130. Referring to FIG. 19, a side view of an attachment mechanism for the table of FIG. 16 is illustrated. In various implementations, the magnet 132 may be attached to a first end of the bolt 134 or rod. A first nut 136 may be included below the magnet to secure the magnet at the first end. A second nut 138, a washer 140, or a nut and washer may be coupled to the bolt 134 or rod and attach the bolt or rod to the bed frame 128. As illustrated, bolt or rod may have a limited degree of movement after the bolt is attached to the bed frame 128 inasmuch as the bed frame is not tightly sandwiched between two nuts or the magnet and the second nut. In various implementations, a spring 142 may be coupled between the magnet and the bed frame. In such implementations, the spring biases the magnet upwards to facilitate a connection with the support while also allowing the magnet to be adjustable in both the height and the level of the magnet (along with the height and level of the bolt attached to the magnet). In other implementations, the attachment mechanism may not include the spring 142. In various implementations, this type of attachment mechanism may be used for all the attachment mechanisms used to secure the table supports to the bed frame, including the first table support 124 to the bed frame.

The first table support 124 and the second table support 126 may each be adjustable horizontally in order to accommodate different sizes and bed designs. In such implementations, the length of the first and second table supports may be configured to telescope or adjust through other mechanisms. Similarly, the first and second table support may also be configured to adjust vertically. In such implementations, the first and second table supports may each include a scissor lift mechanism, a leveling mechanism including any leveling mechanism disclosed herein, or other mechanism configured to adjust a height of the table.

The implementations of tables disclosed herein configured to couple within a bed of a side-by-side ATV or UTV may be disassembled and a stored in a storage container such as a bag or a box. The storage container may be substantially thin inasmuch as the table supports and the slats are all relatively straight elements that may be packaged together in a parallel manner that takes up a minimal amount of space. In such implementations, the table can be easily carried and stored while also having a lightweight structure that allows for a substantial load upon the table. In various implementations. The table may weigh less than 15 pounds, less than 10 pounds, or any other weight.

Any of the implementations of tables disclosed herein may include lighting components. The lighting may include LEDs (light emitting diodes) or other types of lighting. The light emitting elements may be configured to attach to the table supports, legs, arms, platform, or any other portion of the tables disclosed herein. In various implementations, the lighting may be fixedly attached to the table. In other implementations, the lighting may be removably coupled to the table. The lighting may be configured to be powered by the vehicle the table is attached to. In implementations of tables configured to insert within a hitch receiver, the lighting system may be configured to plug into a trailer light connection port on the vehicle. In other implementations, the lighting system of the table may be powered by a battery included in the lighting system of the table. In such implementations, the battery may be rechargeable. The rechargeable battery may be configured to be charged by a vehicle the table is configured to attach to.

In places where the description above refers to particular implementations of tables and implementing components, sub-components, methods and sub-methods, it should be readily apparent that a number of modifications may be made without departing from the spirit thereof and that these implementations, implementing components, sub-components, methods and sub-methods may be applied to other tables.

What is claimed is:

1. A table comprising:
a shank configured to be inserted into a hitch receiver;
a first leg receiver directly coupled to the shank;
a second leg receiver directly coupled to the shank;
a first leg configured to be received into the first leg receiver;
a second leg configured to be received into the second leg receiver;
a first table support configured to couple to an end of the first leg;
a second table support configured to couple to an end of the second leg; and
a first elbow that couples the first leg to the first table support and a second elbow that couples the second leg to the second table support;
wherein the first leg receiver and the second leg receiver extend below the shank when the shank is coupled within a hitch receiver; and
wherein the first leg receiver and the second leg receiver are angled towards one another.

2. The table of claim 1, further comprising a platform configured to rest upon the first table support and the second table support.

3. The table of claim 2, wherein the platform comprises at least eight slats configured to fold relative to one another.

4. The table of claim 1, wherein when the table is coupled within a hitch receiver of a truck, a tailgate of the truck is configured to fold fully down.

5. The table of claim 1, wherein the first leg receiver is directly coupled to a first side of the shank, the second leg receiver is directly coupled to the second side of the shank opposite the first side of the shank, and the first leg receiver contacts the second leg receiver.

6. The table of claim 1, wherein an entire length of the first leg is straight and an entire length of the second leg is straight.

7. A table comprising:
a shank;
a first leg receiver;
a second leg receiver;
a first leg configured to be received into the first leg receiver;
a second leg configured to be received into the second leg receiver;
a first table support configured to couple to an end of the first leg;
a second table support configured to couple to an end of the second leg; and
a first elbow that couples the first leg to the first table support and a second elbow that couples the second leg to the second table support;
wherein the first leg receiver and the second leg receiver extend below the shank when the shank is coupled within a hitch receiver;
wherein the first leg receiver and the second leg receiver extend into a volume of the shank; and
wherein the first leg receiver and the second leg receiver are angled towards one another.

8. The table of claim 7, wherein the first leg receiver contacts the second leg receiver.

9. The table of claim 7, wherein an entire length of the first leg is straight and an entire length of the second leg is straight.

10. The table of claim 7, further comprising a platform configured to directly couple to the first table support and the second table support, wherein the platform comprises a plurality of slats foldable relative to one another.

11. The table of claim 7, wherein when the table is coupled within a hitch receiver of a truck, a tailgate of the truck is configured to fold fully down.

12. A table comprising:

a shank;

a first leg receiver directly coupled to a first side of the shank;

a second leg receiver directly coupled to the second side of the shank;

a first leg configured to be received into the first leg receiver;

a second leg configured to be received into the second leg receiver;

a first table support configured to couple to an end of the first leg, the first table support comprising a first member and a second member;

a second table support configured to couple to an end of the second leg, the second table support comprising a third member and a fourth member;

a platform configured to directly couple to the first table support and the second table support; and a first elbow that couples the first leg to the first table support and a second elbow that couples the second leg to the second table support;

wherein the first leg receiver and the second leg receiver extend below the shank when the shank is coupled within a hitch receiver;

wherein the first leg receiver and the second leg receiver extend into a volume of the shank;

wherein the first member is rotatably coupled to the second member and the third member is rotatably coupled to the fourth member;

wherein the first leg and the second leg are configured to allow a tailgate of a truck to be folded fully downward when the table is coupled within a hitch receiver; and wherein the first leg receiver and the second leg receiver are angled towards one another.

13. The table of claim 12, wherein an entire length of the first leg is straight and an entire length of the second leg is straight.

14. The table of claim 12, wherein the first leg receiver is directly coupled to the second leg receiver.

15. The table of claim 12, wherein the platform comprises 8 or more slats, wherein each of the slats is foldable relative to one another.

16. The table of claim 12, further comprising a first locking pin configured to secure the first table support to a first elbow and a second locking pin configured to secure the second table support to a second elbow.

* * * * *